Figure 2:
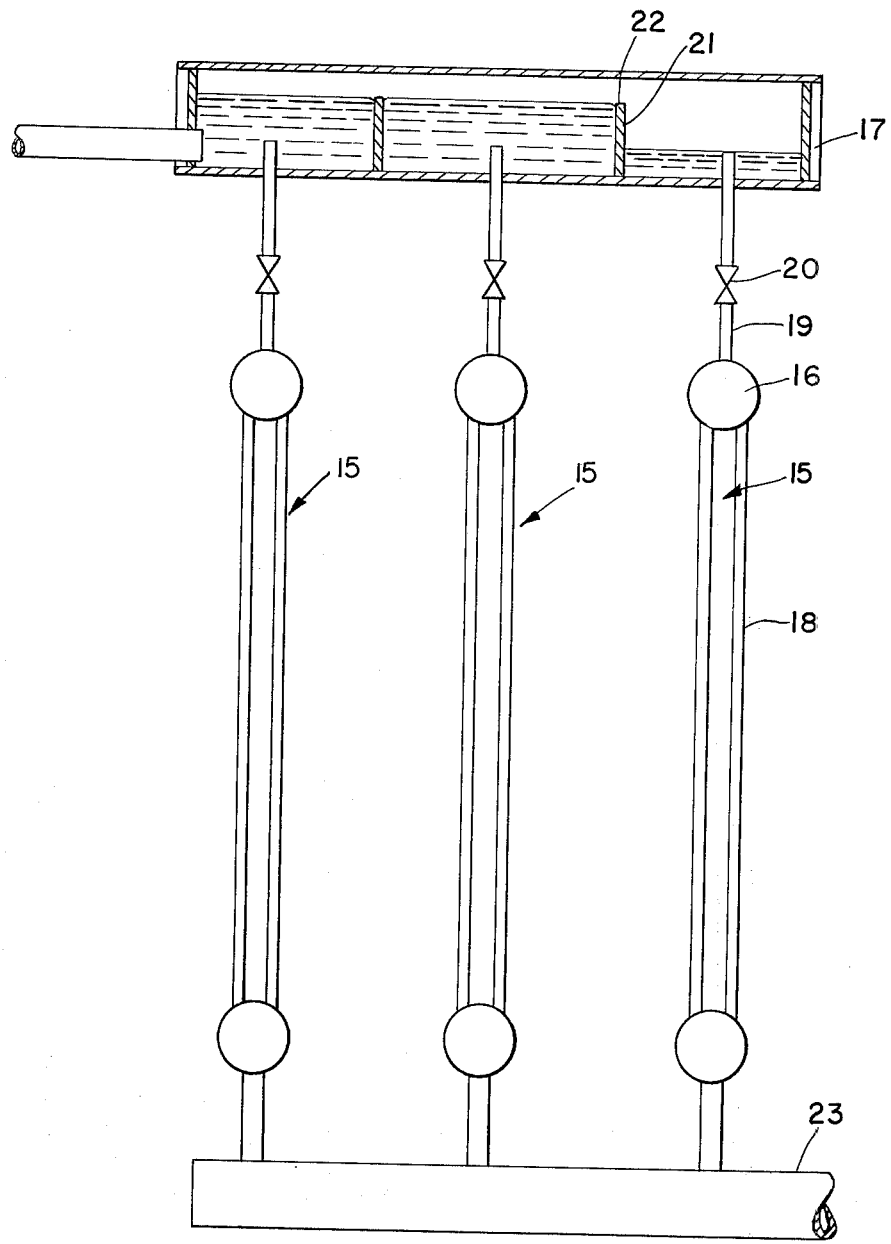

United States Patent [19]
Bressendorff

[11] 3,962,887
[45] June 15, 1976

[54] INDUSTRIAL REFRIGERATION PLANTS OF THE ABSORPTION TYPE

[75] Inventor: Leon Leopold Breslau Bressendorff, Vanlose, Denmark

[73] Assignee: A/S Atlas, Ballerup, Denmark

[22] Filed: Mar. 10, 1975

[21] Appl. No.: 557,102

[30] Foreign Application Priority Data
Mar. 11, 1974 United Kingdom............... 10748/74

[52] U.S. Cl. ............................................... 62/485
[51] Int. Cl.² ....................................... F25B 15/00
[58] Field of Search...................... 62/304, 310, 485

[56] References Cited
UNITED STATES PATENTS

| | | | |
|---|---|---|---|
| 1,079,610 | 11/1913 | Shipley | 62/485 |
| 2,378,177 | 6/1945 | Bichowsky | 62/485 |
| 2,781,644 | 2/1957 | Saposnikov et al. | 62/485 |
| 2,930,204 | 3/1960 | Lang | 62/485 |
| 3,466,893 | 9/1969 | Phillips et al. | 62/485 |

Primary Examiner—Lloyd L. King
Attorney, Agent, or Firm—Harold L. Stowell

[57] ABSTRACT

A refrigeration plant of the absorption type in which the chilled surfaces of the absorber, condenser, and other coolers comprise water-sprinkled tube batteries, said batteries being arranged vertically and in parallel and having a common sprinkling system for distributing the water as a film on the outside of the tubes.

5 Claims, 4 Drawing Figures

FIG.1A.
FIG.1B.
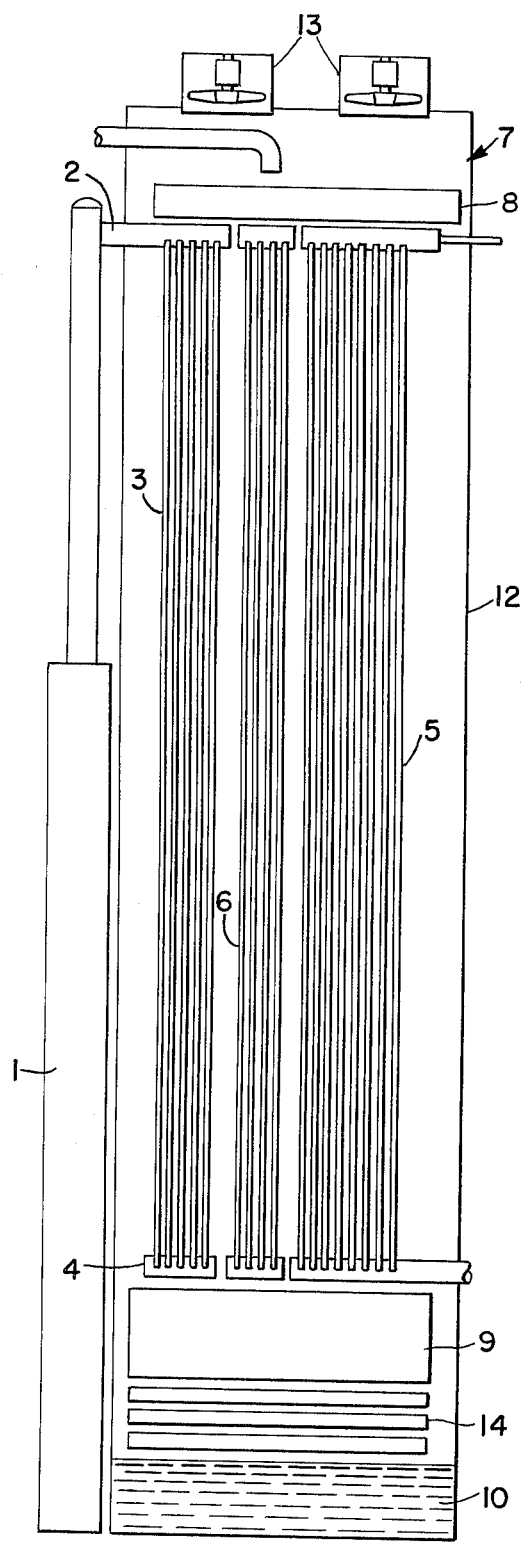
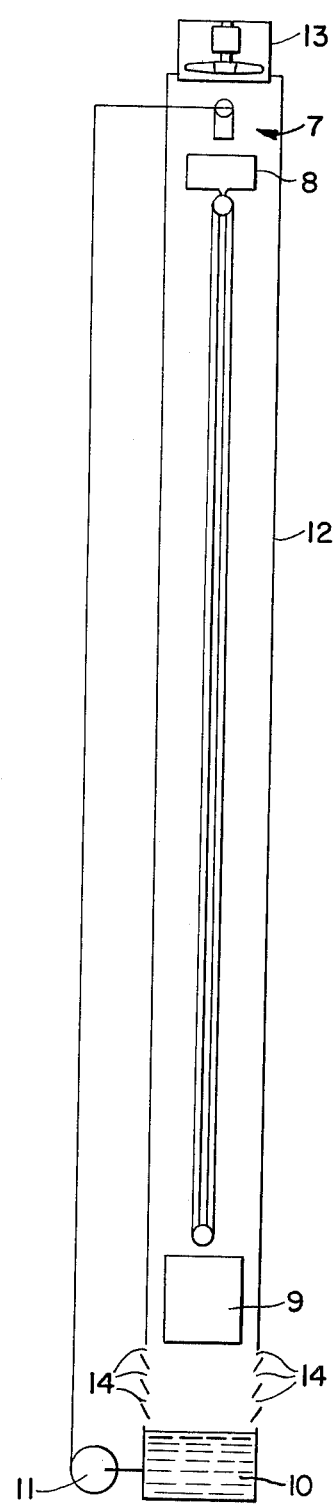

INDUSTRIAL REFRIGERATION PLANTS OF THE ABSORPTION TYPE

The present invention relates to industrial refrigeration plants of the absorption type. Such plants comprise a circulation system for refrigerant, usually ammonia, and a circulation system for absorption liquid, normally an aqueous solution of the refrigerant later referred to as solution.

Such refrigerating plants produce considerable amounts of heat, which have to be removed. Firstly, the amount of thermal units, which are the cooling effect of the plant, secondly, the amount of heat, which has been used for separating the ammonia from the solution, and, thirdly, the amount of heat, which is produced during the absorption of the ammonia in the solution. The plant, therefore, is provided with chilled surfaces for removing this heat.

The chilled surfaces are adapted to the conditions where the plant is to be installed. If cooling water is available in sufficient quantities, the chilled surfaces will normally be made in the form of shell and tube coolers. In small plants or aggregates the chilled surfaces are often made as air-cooled ribbed radiators.

Bigger industrial plants are often provided with sprinkled tube batteries with horizontal tubes. In this type of cooler a substantial part of the cooling takes place in form of evaporation of the cooling water. In order to obtain an effective cooling the distribution of cooling water along the tubes must be uniform. This distribution is difficult to obtain with long horizontal tube batteries. Even if the water is evenly distributed at the upper part of the cooling battery, the water will often have a tendency of concentrating into narrow streams and, therefore, parts of tube surfaces are not effectively cooled. This tendency is increased if, for example, the tubes are not exactly straight or level.

It is the object of the present invention to improve these chilled surfaces in such a way that these drawbacks are eliminated. The chilled surfaces further should be suited for increasing the capacity by simply adding some elements.

According to the invention this is obtained in an industrial refrigeration plant of the absorption type in which the chilled surfaces are arranged in heat exchangers with vertical tubes, which are sprinkled in a common system. The vertical tubes provide a uniform distribution in the total height of the heat exchanger and owing to the relatively small horizontal dimensions it is easy to secure an even distribution of cooling water even though all the cooling batteries of the refrigeration plant are collected in a common sprinkler system. The heat exchangers are not provided with an external cover or container, which means a saving in weight compared with normal shell and tube coolers.

Preferably, the solution is distributed as a film also on the internal surfaces of the absorber. This provides a large surface of the absorption medium and an effective transfer of the heat arising from the absorption of the ammonia to the cooling water streaming in the form of a film on the outside of the tubes. The effective heat transfer contributes to a reduction of dimensions and of the weight of the absorber unit.

It is important that the film of solution on the inside of the tubes is uniform in thickness in order to control the capacity of the refrigeration plant. According to the invention this uniform film is obtained by means of a number of divisions arranged in a manifold above the absorber tubes, each division being provided with an overflow. If the refrigeration plant is not operated at full capacity, the rearmost of the absorber tubes will be cut out, the foremost ones still having a normal flow of solution. This arrangement facilitates a stable operation of the absorber.

The cooling arrangement according to the invention will normally have a height of 6 to 10 meters. This height may be used to simplify the air-purger. According to the invention the air-purger comprises means for compressing the air and ammonia from the top of the absorber, means for absorbing the ammonia from the compressed air, and valve means for blowing off air. The compression means are an injector driven by means of solution from a desorbing column, and from which the solution and air are fed to an absorption column being one of the legs in a U-shaped stand-pipe, the other leg being filled with solution and balancing the low absorption pressure. The valve means are a simple float valve provided in the first leg of the U-shaped stand-pipe.

In this arrangement the big height of the heat exchangers is used to provide a stand-pipe, which balances the low absorber pressure of the plant. This arrangement is extremely simple and — apart from the float valve — without moving parts making the air-purger extremely reliable in operation. The U-shaped stand-pipe is further placed in close relationship to the cooler, improving the absorption of the ammonia before the air escapes through the valve means.

The stand-pipe is normally connected to the inlet of solution into the absorber, and when the plant is not in operation, the float valve automatically prevents escape of ammonia.

According to the invention the vertical, sprinkled, chilled surfaces further comprise an additional cooler for the solution between the heating section and the absorber. Further, the heat exchanging unit may comprise a cooling element, by means of which the circulated cooling water may be cooled, or the vertical tubes may be surrounded by a screen, which is provided with a fan, said fan enhancing the evaporation of the water flowing on the outside of the vertical tubes.

Figure 3:
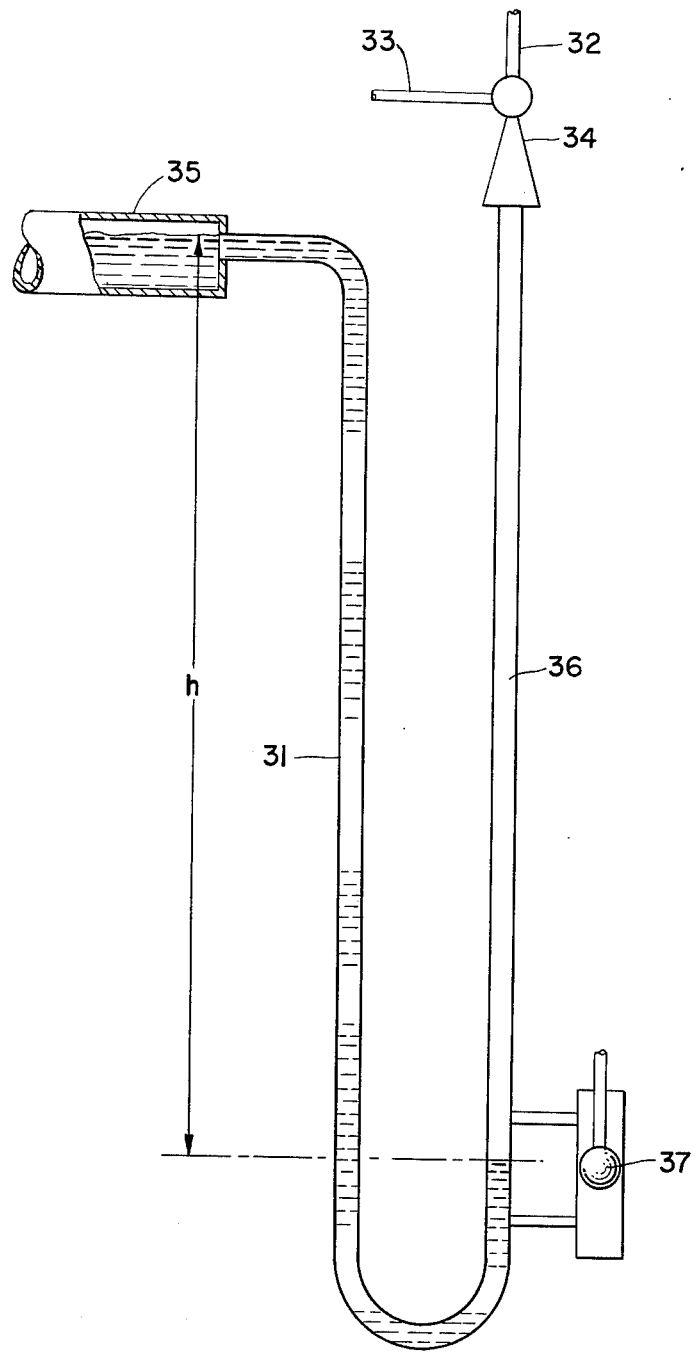

The invention will be described more detailed in the following with reference to the drawings, in which FIG. 1A and 1B show the arrangement of the chilled surfaces in the plant according to the invention in schematic, longitudinal and cross section, respectively, FIG. 2 shows a schematic section through the absorber in the plant according to FIG. 1, and FIG. 3 shows the air-purger in the refrigeration aggregate according to the invention.

In FIG. 1 an absorption cooling plant is illustrated. The plant comprises a boiler-rectification column 1, from which the vaporized ammonia through a manifold 2 is fed to a condenser 3, comprising a battery 3 of parallel tubes. The condensed ammonia is collected in a lower manifold 4, from which it is led to the evaporator under low pressure in the form of cooling batteries in the rooms or machines to be refrigerated.

The ammonia vapour leaving the evaporator is led to an absorber 5, which like the condenser 3 is formed as a vertical tube battery. In the absorber the vaporized ammonia meets the solution, which in the boiler-rectification column 1 was freed from the ammonia. The solution is distributed in the vertical tubes in form of an internal film providing a large surface for absorption of the ammonia and providing an effective removal of the heat originating from the absorption. Because of the internal film of solution in the tubes, the removal of heat will be uniform and the temperature will be low, thus providing a high concentration of ammonia in the solution. The solution of ammonia in the water is pumped from the absorber 5 back to the boiler-rectification column 1, thereby closing the circuit of ammonia.

Solution, which is substantially freed from the ammonia, leaves the boiler-rectification column and the conventional solution heat exchanger through an additional cooler 6, which like the condenser and the absorber is a vertical tube battery.

The three tube batteries forming the chilled surfaces are placed together in an integrated cooling tower 7. From a reservoir 8 cooling water is distributed over the tube batteries flowing as a film on the outside of the tubes providing an effective heat exchange.

Further, the cooling water will present a large surface to the air, increasing the evaporation of the cooling water and thereby the cooling effect. Underneath the tube batteries a cooler 9 is placed, over the surface of which the water is distributed by means of the lower manifolds. The water collects in a basin 1o underneath the cooler 9 and a pump 11 delivers the cooling water to the reservoir 8. The tube batteries are enclosed in a casing 12, and on the top of the casing fans 13 are placed, said fans providing air circulation through the cooling tower. The air is taken in through openings 14 with spray shields near the bottom of the tower.

In FIG. 2 a diagrammatic section through the absorber 5 (FIG. 1) is shown. The absorber comprises a number of sections 15, each having a secondary manifold 16 connected with the main manifold 17.

It is important to obtain a uniform film of solution on the inside face on each of the tubes 18, which has a distributing means at the inlet in order to obtain the uniform film and to connect the tubes to the secondary manifold in such a way that the vaporized ammonia can pass freely through the inlet. Between the main manifold 17 and the secondary manifolds connection pipes are provided, said pipes having a flow regulation means 20, by means of which the optimal flow for each of the sections can be adjusted.

In the main manifold 17, dividers 21 are provided, each having an overflow opening 22. This ensures full flow to the first sections 15, while the last or rearmost sections are cut out of operation one by one when the flow of solution is reduced. This arrangement makes the operation of the absorber stable and facilitates the regulation of the cooling capacity of the plant.

The vapours of ammonia are preferably fed to the lower manifold 23 of the absorber 5. The ammonia and the solution are moving in counterflow. Possible entrained air will collect in main manifold 17, which therefore is connected to an air-purger.

The air-purger is illustrated in FIG. 3. The big height of the tube batteries of the chilled surfaces is used to simplify the construction of the air-purger.

The air-purger comprises a U-shaped stand-pipe 31, in which a column of solution is formed with the height h balancing the low pressure in the absorber 35.

Possible air in the absorber will block flow of vaporized ammonia and reduce the capacity of the plant. From the absorber 35 an air outlet tube 33 is leading to an ejector 34, which is driven by solution under pressure, which is supplied through a pipe 32.

The ejector 34 is connected with the leg 36 of the U-shaped stand-pipe which is empty of solution during the operation of the plant. This leg serves as absorption column for ammonia vapours, which are fed with the air through the air outlet tube 33. The solution flows along the inner wall of the leg 36 of the stand-pipe as a film, which absorbs the major part of ammonia. The leg 36 is preferably placed closed to the chilled surfaces (FIG. 1) in order to remove the heat produced by the absorption.

A float valve 37 is connected with the leg 36 of the stand-pipe through two pipe connections, one above and the other below the level of the liquid in the stand-pipe. The upper connection may comprise separating means for separating droplets of solution from the air to be blown out.

When not in operation the pressure in the absorber 35 and the leg 36 will equalize and the level in 36 will rise closing the float valve. When not in operation, the air-purger according to the invention will automatically prevent loss of the ammonia.

I claim:

1. In a refrigeration plant of the absorption type comprising a circulation system for refrigerant, a circulation system for absorption liquid and chilled surfaces of the absorber, condenser and additional coolers, said surfaces comprising water-sprinkled tube batteries, the improvement comprising that the tube batteries are arranged vertically and in parallel and comprise a common sprinkling system for distributing the water as a film on the outside of the tubes.

2. Refrigeration plant according to claim 1, in which the vertical tube batteries are provided with means for distributing the absorption and other liquid to be cooled with means for distributing the liquid as a film on the inside of the tubes.

3. Refrigeration plant according to claim 2, in which the tube batteries are provided with a manifold comprising dividers with overflow openings ensuring full flow to the foremost sections of the tube batteries and cutting out the rearmost sections when the flow rate is reduced.

4. Refrigeration plant according to claim 3, in which a stand-pipe is connected to the manifold of the absorber with one leg, the other leg being connected with compressor means for compressing air-containing gas from the top of the absorber, said other leg being provided with a float valve for escape of air.

5. Refrigeration plant according to claim 1, in which the arrangement of the tube batteries comprises a screen surrounding the vertical tubes, said screen being provided with a fan for circulating air along the tube batteries.

* * * * *